United States Patent
Whitman

(10) Patent No.: US 11,916,211 B2
(45) Date of Patent: *Feb. 27, 2024

(54) EXTINGUISHING BATTERY THERMAL RUNAWAY

(71) Applicant: Hamilton Sundstrand Corporation, Charlotte, NC (US)

(72) Inventor: Chase Whitman, Mandeville, LA (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/485,236

(22) Filed: Sep. 24, 2021

(65) Prior Publication Data

US 2022/0102779 A1 Mar. 31, 2022

Related U.S. Application Data

(60) Provisional application No. 63/084,345, filed on Sep. 28, 2020.

(51) Int. Cl.
| | | |
|---|---|---|
| *H01M 10/6557* | (2014.01) | |
| *H01M 50/682* | (2021.01) | |
| *H01M 50/24* | (2021.01) | |
| *H01M 50/383* | (2021.01) | |

(52) U.S. Cl.
CPC ....... *H01M 10/6557* (2015.04); *H01M 50/24* (2021.01); *H01M 50/383* (2021.01)

(58) Field of Classification Search
CPC . H01M 10/6557; H01M 50/24; H01M 50/383
See application file for complete search history.

(56) References Cited

U.S. PATENT DOCUMENTS

| | | |
|---|---|---|
| 9,093,726 B2 | 7/2015 | Prilutsky et al. |
| 9,467,000 B2 | 10/2016 | Rivera-Poventud et al. |
| 9,525,290 B2 | 12/2016 | Snyder |
| 9,806,325 B2 | 10/2017 | Woehrle et al. |
| 9,912,021 B2 | 3/2018 | Andres |
| 10,141,613 B2 | 11/2018 | Schaffner et al. |
| 10,547,183 B2 | 1/2020 | Halsey |
| 10,608,292 B2 | 3/2020 | Yang et al. |

(Continued)

FOREIGN PATENT DOCUMENTS

| | | |
|---|---|---|
| CN | 108011158 A | 5/2018 |
| WO | 2020016138 A1 | 1/2020 |

OTHER PUBLICATIONS

Fu, Huifang. CN108011158A. May 8, 2018. English machine translation by EPO. (Year: 2018).*

(Continued)

*Primary Examiner* — James Lee
(74) *Attorney, Agent, or Firm* — Locke Lord LLP; Joshua L. Jones; Gabriella D'Angelo

(57) ABSTRACT

A system includes a stack of battery cells within a container. An interior space of the container is filled with a coolant in direct contact with the cells. There need be no intervening containers between the coolant in the interior space of the container, and the cells. A method can include detecting a thermal runaway event in one or more of the cells, and admitting some of the coolant at a first pressure into the one or more cells at a second pressure lower than the first pressure.

9 Claims, 5 Drawing Sheets

(56) References Cited

U.S. PATENT DOCUMENTS

| | | |
|---|---|---|
| 10,608,299 B2 | 3/2020 | Newman |
| 10,629,967 B2 | 4/2020 | Seo et al. |
| 2011/0189511 A1* | 8/2011 | Yoon .................. H01M 10/486 |
| | | 429/50 |
| 2012/0263981 A1 | 10/2012 | Norden et al. |
| 2014/0335381 A1 | 11/2014 | Krolak |
| 2015/0188203 A1* | 7/2015 | Enomoto .............. H01M 50/24 |
| | | 429/83 |
| 2016/0380247 A1 | 12/2016 | Juzkow et al. |
| 2018/0034116 A1 | 2/2018 | Tajima et al. |
| 2018/0233791 A1 | 8/2018 | Tong et al. |
| 2019/0088981 A1* | 3/2019 | Chen ....................... H01M 4/13 |
| 2020/0036047 A1 | 1/2020 | Aikens et al. |

OTHER PUBLICATIONS

Extended European Search Report dated Feb. 11, 2022, issued during the prosecution of European Patent Application No. EP 21199456.1, 6 pages.

\* cited by examiner

EXTINGUISHING BATTERY THERMAL RUNAWAY

CROSS-REFERENCE TO RELATED APPLICATIONS

This application claims priority to and the benefit of U.S. Provisional Application No. 63/084,345, filed Sep. 28, 2020, the entire contents of which are herein incorporated by reference in their entirety.

BACKGROUND

1. Field

The present disclosure relates to energy storage such as batteries, and more particularly to energy storage such as batteries for use in aircraft, including more-electric, hybrid-electric, and full-electric aircraft.

2. Description of Related Art

High-energy dense battery cells for use on hybrid electric or full electric aircraft, such as lithium ion (Li-Ion) cells, can potentially pose a fire hazard risk due to chemically induced thermal runaway between the anode and cathode active materials. Thermal runaway of a Li-ion cell can be caused by many external and internal failure modes, most of which induce some type of short circuit of the internal cell chemistry. Cell chemistries can contain organic compounds that are flammable and active material that evolve various concentrations of hydrogen and hydrocarbon gasses that further precipitate thermal events. Methods to prevent, stop, or extinguish these types of chemical reactions and thermal events are the center of Li-Ion battery research.

The most common method to extinguish a high power, high capacity thermal battery fire is to use large amounts of water to flood a battery system, thereby cooling the reaction and slowing reactions rates such that flames produced by side reactions cease. An example of this is the fire department using water on a car Li-Ion battery fire. This is an effective solution for extinguishing a car fire containing Li-Ion batteries undergoing thermal runaway. However, a payload of water onboard an aircraft for the sole purpose of extinguishing a battery fire is impractical.

The conventional techniques have been considered satisfactory for their intended purpose. However, there is an ever present need for improved systems and methods for extinguishing thermal runaway in batteries. This disclosure provides a solution for this need.

SUMMARY

A system includes a stack of battery cells within a container. An interior space of the container is filled with a coolant in direct contact with the cells.

There need be no intervening containers between the coolant in the interior space of the container, and the cells. The stack can include a first electrode inside the container on a first end of the stack and a second electrode in the container on a second end of the stack opposite the first end, wherein the cells are connected in electrical series with one another between the electrodes. A pump can be included within the interior space of the container is in fluid communication with the coolant to circulate the coolant for active cooling of the cells. The coolant can be a fire retardant material including 3M Novec 7000.

The coolant in the interior space can be pressurized to a first pressure, and each cell can have a cell interior pressurized to a second pressure lower than the first pressure. A respective valve can be included in at least one of the cells for admitting the coolant at the first pressure into the cell interior of the at least one cell at the second pressure in the event of a thermal run away event, and for keeping the coolant out of the at least one cell otherwise.

A gas detector and/or pressure detector can be included within the interior space of the container, operatively connected to each respective valve of the at least one of the cells to open each respective valve in the event of detecting gas and/or pressure within the interior space of the container indicative of a thermal runaway. It is also contemplated that each cell can have at least one of a respective voltage sensor, a respective temperature sensor, and/or a respective pressure sensor for monitoring for thermal runaway.

A controller can be operatively connected to the respective sensor or sensors of each cell, and can be operatively connected to each respective valve to control the valves to contain thermal runaway. The controller can be configured to detect thermal runaway in an individual cell, and to open the respective valve of the individual cell leaving other valves closed.

A method includes cooling a stack of battery cells with coolant in an interior space of a container, wherein the cells are within the interior space.

The method can include detecting a thermal runaway event in one or more of the cells, and admitting some of the coolant at a first pressure into the one or more cells at a second pressure lower than the first pressure. Admitting some of the coolant into the one or more cells can include opening a valve to admit coolant from the interior space of the container into an internal space of each of the one or more cells.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
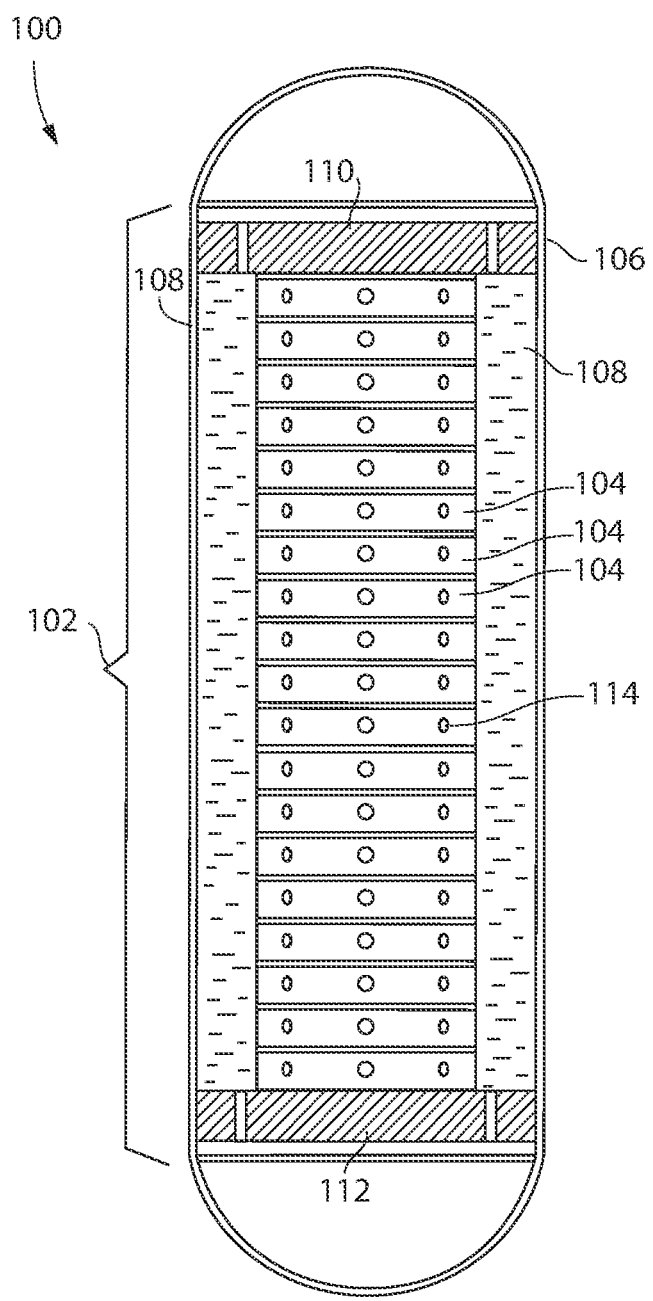
FIG. 1 is a cross-sectional perspective view of a system constructed in accordance with the present disclosure, showing the stack of cells and electrodes within the container with coolant.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can provide battery cooling fluid to not only cool a battery cell or system, but also targets and prevents and/or extinguishes a battery thermal runaway in volume and weight sensitive applications.

Figure 2:
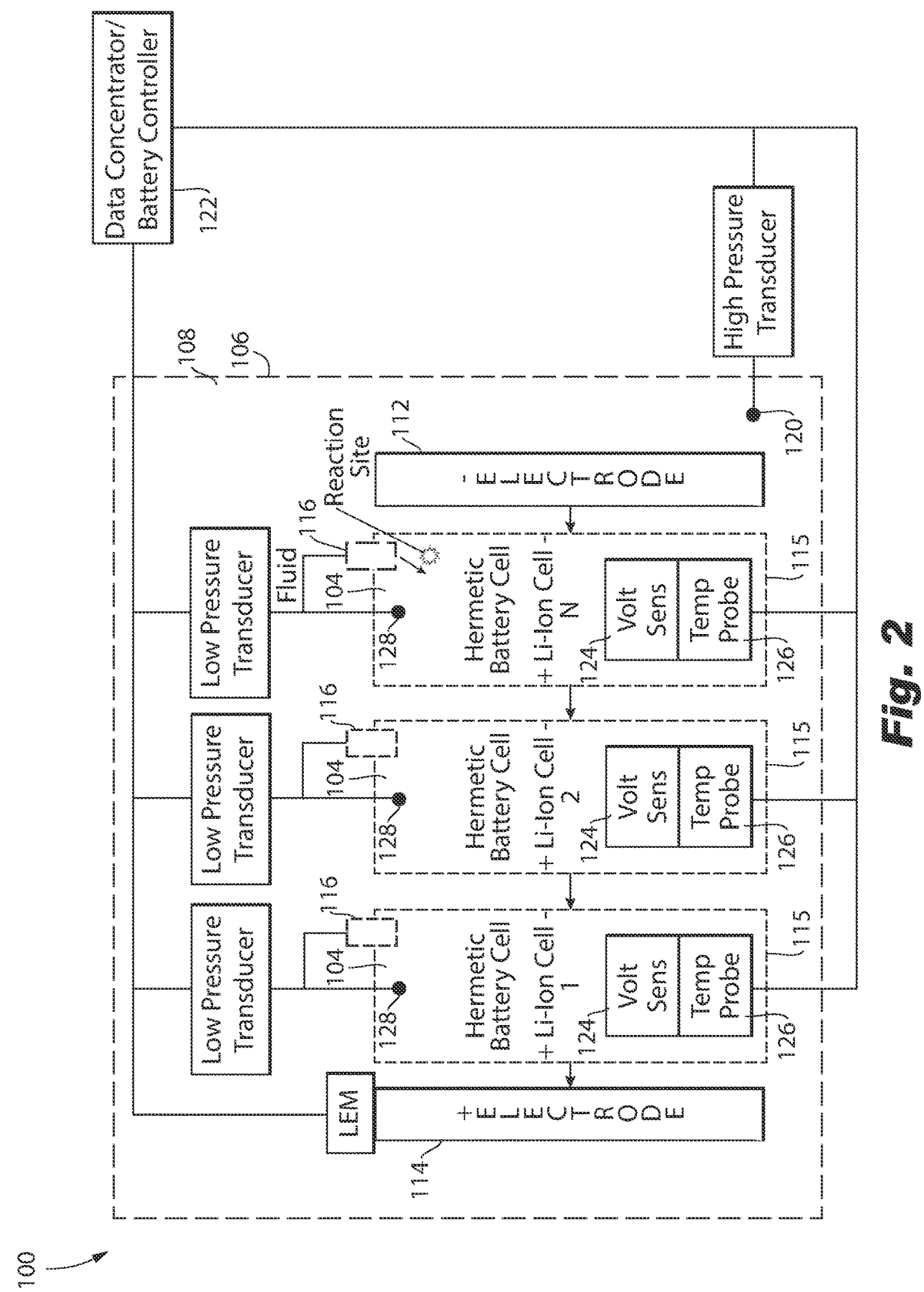
FIG. 2 is a schematic view of the system of FIG. 1, showing the stack of cells with valves.
Figure 3:
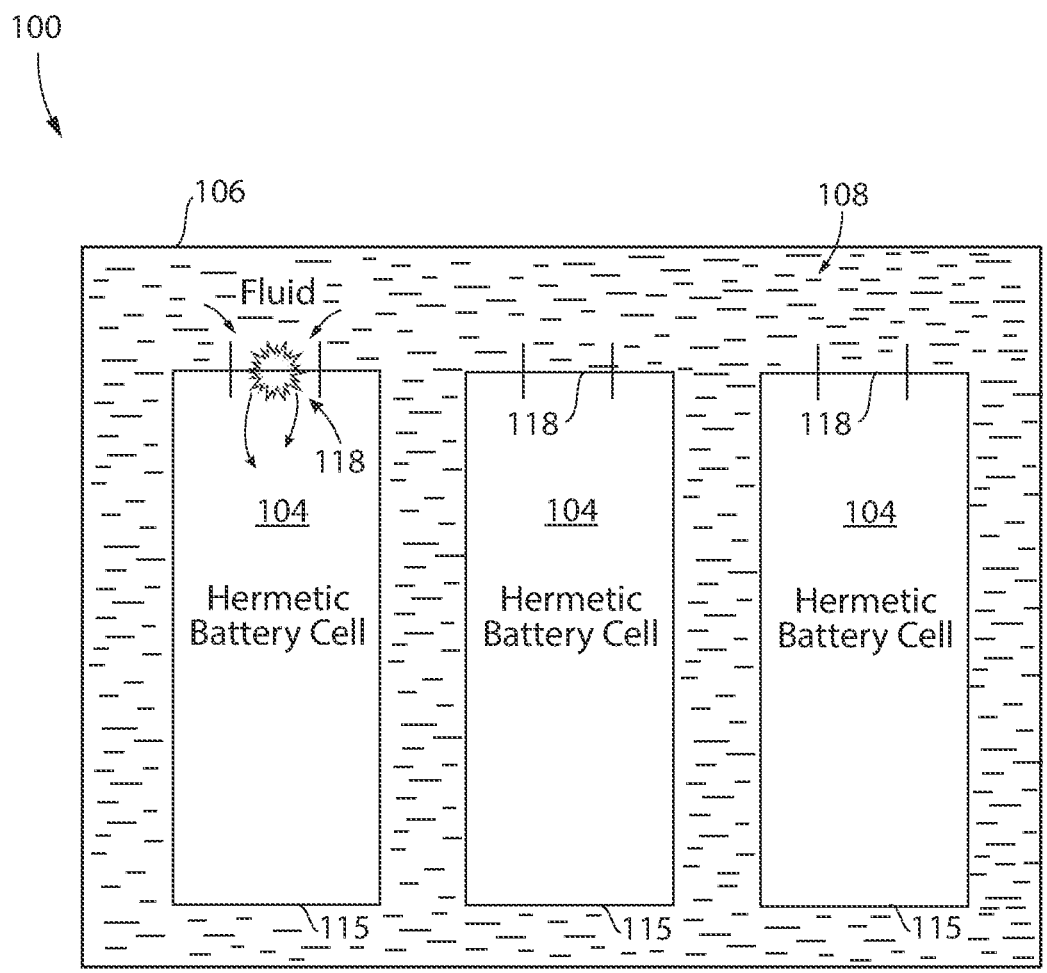
FIG. 3 is a schematic view of another embodiment of a system constructed in accordance with the present disclosure, showing cells without valves.

The system 100 includes a stack 102 of battery cells 104 electrically connected in series with one another within a container 106. An interior space 108 of the container 106 is filled with a coolant in direct contact with the cells 104. There are no intervening containers between the coolant in the interior space 108 of the container 106, and the cells 104. The stack 102 includes a first electrode 110, e.g. an anode connected in series with the cells 104, inside the container 106 on a first end of the stack 102. The stack 102 includes a second electrode 112 in the container 106 on a second end of the stack opposite the first end, e.g. connected in series with the cells 104 as a cathode. The cells include openings 114 in the cell walls 115 for controlled admission of coolant into the cells, which can be in the form of valves 116 as shown in FIG. 2, or in the form of burst disks or openings 118 through the walls 115 as shown in FIG. 3, or any other suitable type of opening. The openings 118 can be configured to burst or open under conditions, e.g. pressures, temperatures, and/or voltages, indicative of thermal runaway in a given cell 104. Each cell 104 has active battery chemistry within its wall 115. During normal operation, the cell wall 115 keeps the coolant hermetically sealed from the active battery chemistry within the cell wall 115, but upon opening of the cell wall, the coolant can enter the active chemistry of the cell 104 as a retardant against thermal runaway. The coolant is thus a coolant and a retardant. The coolant can be a fire retardant material including Novec 7000 (available from the 3M Company of Maplewood, Minnesota, USA).

With reference now to FIG. 2, the coolant in the interior space 108 is pressurized to a first pressure, and wherein each cell 104 has a cell interior (the active chemistry volume within the wall 115) that is pressurized to a second pressure lower than the first pressure. Three cells are shown in FIG. 2 for schematic reasons, but those skilled in the art will readily appreciate that any suitable number of cells can be used without departing from the scope of this disclosure. A respective valve 116 is included in each of the cells 104 for admitting the coolant from the interior space 108 at the first pressure into the cell interior of the respective cell 104 at the second pressure in the event of a thermal run away event. When there is no thermal runaway event, the valves 116 keep the coolant out of each the cells. Since the pressure immediately outside the cells 104 is higher than the pressure inside the active chemistry portion of the cells 104, if the valve/opening opens, the pressure differential will drive coolant from the interior space into the active chemistry portion of the cell. Otherwise, only wall 115 separates between the active chemistry portion of the cells 104 and the coolant in the internal space 108 of the container 106.

With continued reference to FIG. 2, a gas detector and/or high-pressure detector 120 can be included within the interior space 108 of the container. The detector 120 is operatively connected, through the controller 122, to each respective valve 116 of the cells 104 to open each respective valve 116 in the event of detecting gas and/or high pressure within the interior space 108 of the container 106 indicative of a thermal runaway. It is also contemplated that each cell 104 can have at least a respective voltage sensor 124, a respective temperature sensor 126, and/or a respective pressure sensor 128, e.g. a low-pressure transducer, for monitoring for thermal runaway. Each of the sensor/detectors 124, 126, and 128 is also operatively connected to the valves 116 through the controller 122 to open the valves 116 in the event of a thermal runaway event.

With continued reference to FIG. 2, the controller 122 is operatively connected to the respective sensor or sensors of each cell 104, to the pressure detector 120, and is operatively connected to each respective valve 116 to control the valves to contain thermal runaway. The controller 122 is configured to detect thermal runaway in an individual cell 104, and to open the respective valve 116 of the individual cell leaving other valves closed if they do not have thermal runaway.

Figure 4:
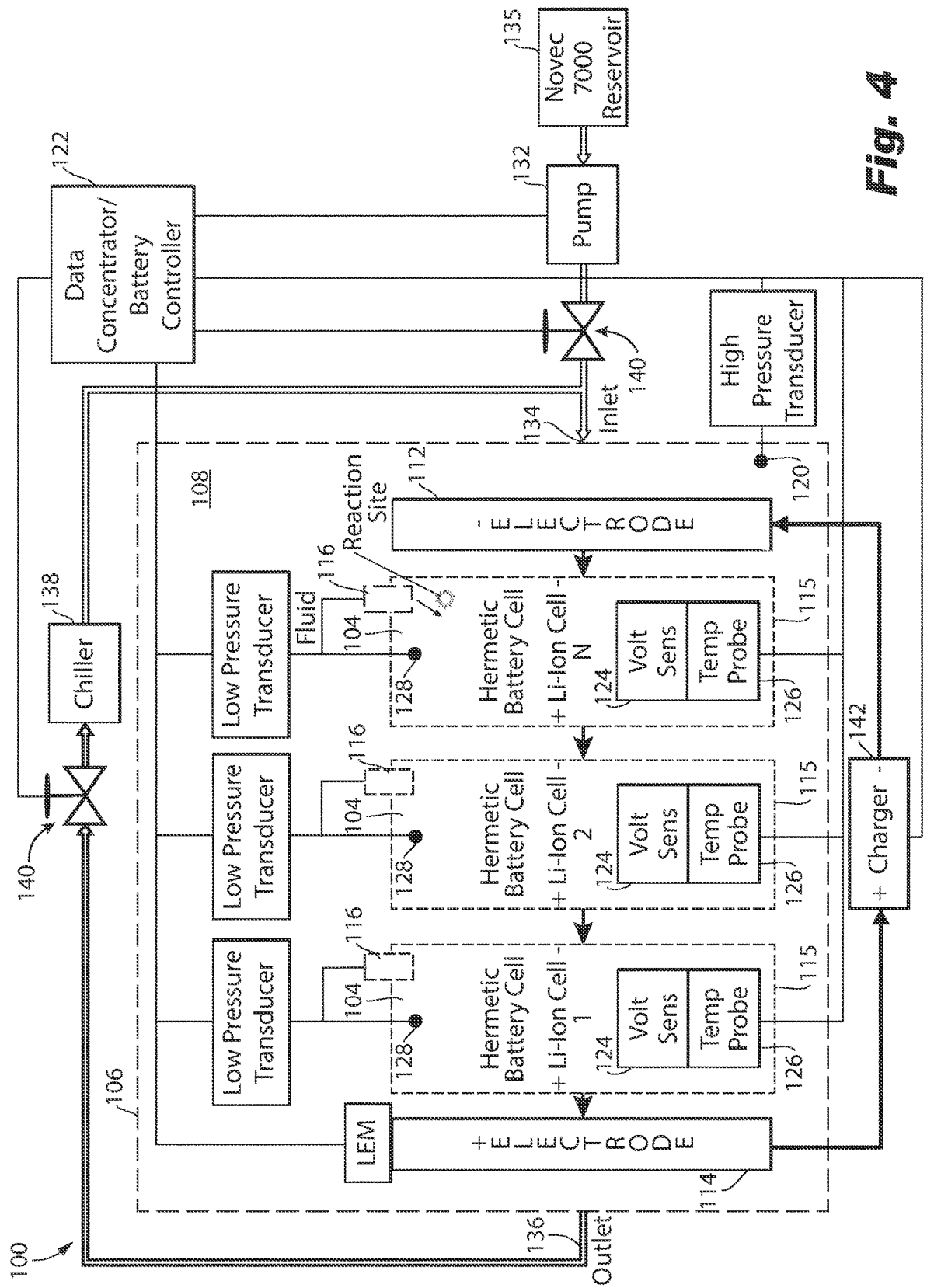
FIG. 4 is a schematic view of another embodiment of a system in accordance with the present disclosure, showing an external chiller and pump.
Figure 5:
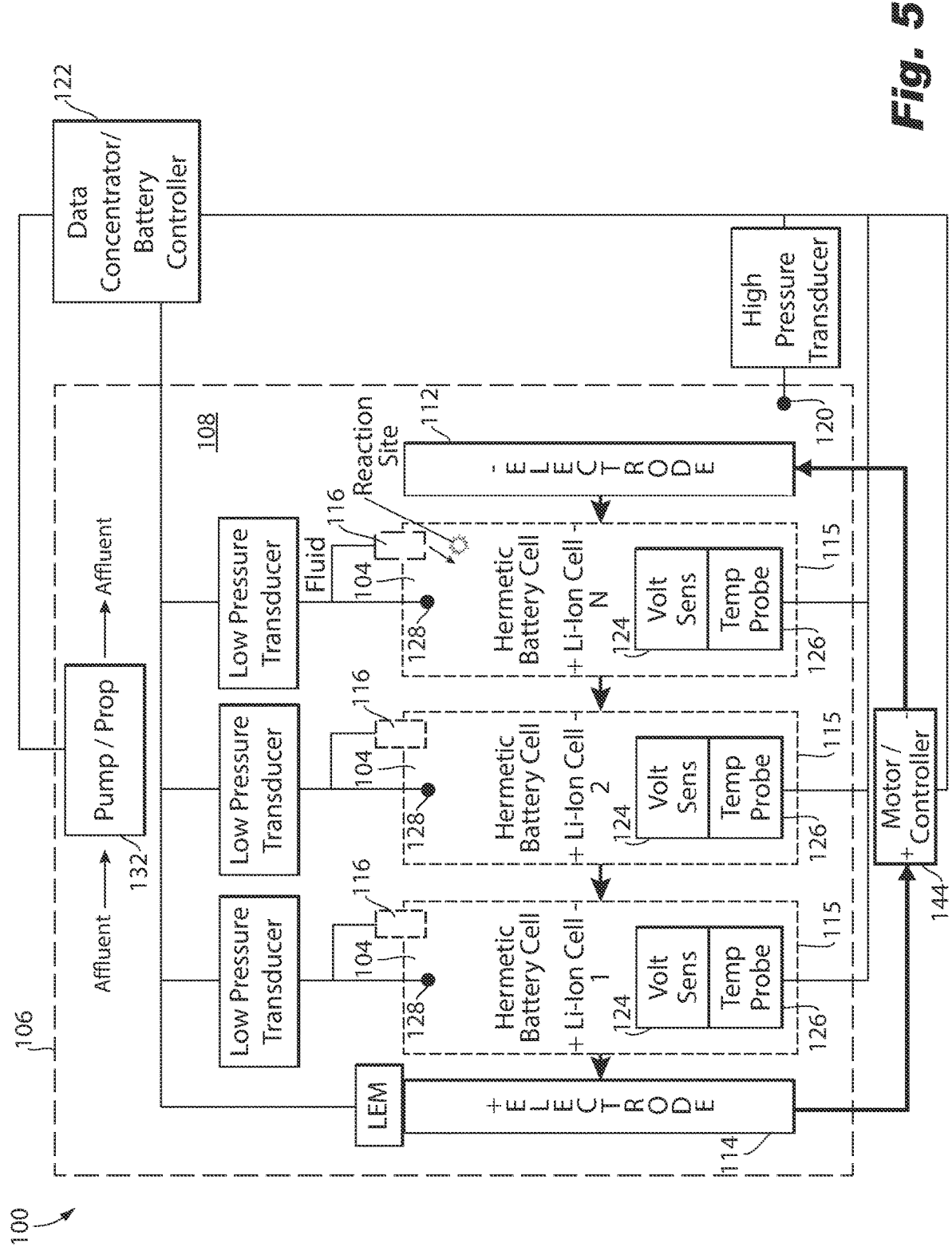
FIG. 5 is a schematic view of another embodiment of a system in accordance with the present disclosure, showing a pump inside the container.

With reference now to FIG. 4, a pump 132 external from the interior space 108 of the container 106 can be connected to a coolant inlet 134 of the container 106. The pump 132 can drive a flow of coolant from a coolant reservoir 135 into the interior space 108. Coolant can egress from the interior space though fluid outlet 136. The pump 132 and a chiller 138 can cooperate to circulate cooled coolant through the interior space, removing heat from the cells 104. The chiller 138, pump, 132, and reservoir 135 can be ground based equipment so that the cells 104 can be actively cooled, e.g. while an electric or hybrid electric aircraft is at the gate as indicated in FIG. 4 by the charger 142. The controller 122 is operatively connected to valves 116 to allow or shut off flow of coolant through the interior space. It is also contemplated with reference to FIG. 5, that a pump 132 can be contained within the interior space 108 of the container 106, to be carried on board the aircraft for active cooling whether changing, discharging, or idling the battery system 100. The controller 122 is operatively connected to the pump 132 to control coolant circulation within the interior space 108 for active cooling of the cells 104. FIG. 5 also shows the motor/controller 144 electrically connected to the electrodes 110, 112 for powering the aircraft or the like. Those skilled in the art will readily appreciate that while only FIG. 5 shows the motor/controller 144, a motor/controller can be connected to any of the embodiments of battery systems of FIGS. 1-5 in a similar manner. Those skilled in the art will also readily appreciate that while only FIG. 4 shows a charger 142 connected to the electrodes 110, 112, that charger can be connected to the battery system of any of FIGS. 1-5 in a similar manner.

A method includes cooling a stack, e.g. stack 102, of battery cells with coolant in an interior space of a container, wherein the cells are within the interior space. The method can include detecting a thermal runaway event in one or more of the cells, and admitting some of the coolant at a first pressure into the one or more cells at a second pressure lower than the first pressure. Admitting some of the coolant into the one or more cells includes opening a valve, e.g. valves 116 of FIG. 2, to admit coolant from the interior space of the container into an internal space of each of the one or more cells.

Since the coolant and retardant are one and the same fluid, the battery system 100 is lighter and simpler than systems where a separate coolant supply and retardant supply are needed. The lighter weighed and reduced complexity of systems and methods as disclosed herein can be advantageous for aerospace applications, e.g. more-electric aircraft, hybrid-electric aircraft, and all electric aircraft.

The methods and systems of the present disclosure, as described above and shown in the drawings, provide for cooling batteries and controlling/extinguishing thermal runaway. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a stack of battery cells within a container, wherein an interior space of the container is filled with a coolant in direct contact with the battery cells, wherein the coolant in the interior space is pressurized to a first pressure, and wherein each battery cell has a cell interior pressurized to a second pressure lower than the first pressure;
   a respective valve included in at least one of the battery cells for admitting the coolant at the first pressure into the cell interior of the at least one battery cell at the second pressure in the event of a thermal runaway event, and for keeping the coolant out of at least one battery cell otherwise; and
   a controller operatively connected to a respective sensor or sensors of each battery cell for monitoring thermal runaway, and operatively connected to each respective valve to control each of the respective valves to contain thermal runaway, wherein the controller is configured and adapted to allow or shut off flow of the coolant by controlling each respective valve.

2. The system as recited in claim 1, wherein there are no intervening containers between the coolant in the interior space of the container and the battery cells.

3. The system as recited in claim 1, further comprising a pump within the interior space of the container in fluid communication with the coolant to circulate the coolant for active cooling of the battery cells.

4. The system as recited in claim 1, wherein the coolant is a fire retardant material.

5. The system as recited in claim 1, further comprising a gas detector within the interior space of the container, operatively connected to each respective valve of the at least one of the battery cells to open each respective valve in the event of detecting gas within the interior space of the container indicative of a thermal runaway.

6. The system as recited in claim 1, further comprising a pressure detector within the interior space of the container, operatively connected to each respective valve of the at least one of the battery cells to open each respective valve in the event of detecting pressure within the interior space of the container indicative of thermal runaway.

7. The system as recited in claim 1, wherein the respective sensor or sensors is at least one of a respective voltage sensor, a respective temperature sensor, and/or a respective pressure sensor for monitoring for thermal runaway.

8. The system as recited in claim 1, wherein the controller is configured to detect thermal runaway in an individual cell, and to open the respective valve of the individual cell leaving other valves closed.

9. The system as recited in claim 1, wherein the stack includes a first electrode inside the container on a first end of the stack and a second electrode in the container on a second end of the stack opposite the first end, wherein the battery cells are connected in electrical series with one another between the electrodes.

* * * * *